United States Patent [19]

Akao

[11] Patent Number: 5,026,600
[45] Date of Patent: Jun. 25, 1991

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 234,694

[22] Filed: Aug. 22, 1988

[30] Foreign Application Priority Data

Aug. 24, 1987 [JP] Japan ................... 62-208221

[51] Int. Cl.$^5$ ............... B32B 5/16; B32B 9/00; B29D 22/00
[52] U.S. Cl. .................. 428/328; 428/408; 428/461; 428/476.9; 428/483; 428/516; 428/520; 428/35.3; 428/35.8; 206/455; 229/3.5 R
[58] Field of Search ............. 428/328, 339, 340, 461, 428/408, 516, 483, 476.9

[56] References Cited

U.S. PATENT DOCUMENTS

| | | |
|---|---|---|
| 4,147,291 | 4/1979 | Akao et al. . |
| 4,258,848 | 3/1981 | Akao et al. . |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. . |
| 4,386,124 | 5/1983 | Akao . |
| 4,411,943 | 10/1983 | Akao . |
| 4,411,945 | 10/1983 | Akao et al. . |
| 4,436,809 | 3/1984 | Akao et al. . |
| 4,452,846 | 6/1984 | Akao . |
| 4,469,741 | 9/1984 | Akao . |
| 4,513,050 | 4/1985 | Akao . |
| 4,565,733 | 1/1986 | Akao . |
| 4,565,743 | 1/1986 | Akao . |
| 4,576,865 | 3/1986 | Akao . |
| 4,579,781 | 4/1986 | Akao . |
| 4,584,234 | 4/1986 | Hirose et al. . |
| 4,587,175 | 5/1986 | Akao . |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,708,896 | 11/1987 | Akao . |
| 4,730,778 | 3/1988 | Akao et al. . |
| 4,906,494 | 3/1990 | Babinec et al. ............... 428/516 |
| 4,917,925 | 4/1990 | Loretti et al. ............... 428/516 |

Primary Examiner—P. C. Sluby
Attorney, Agent, or Firm—Burns, Doane, Swecker & Mathis

[57] ABSTRACT

A packaging material for photosensitive materials which comprises packaging material which comprises a coextruded multilayer light-shielding film comprising an ethylene copolymer resin layer containing more than 30 wt. % of ethylene copolymer resin and an antioxidant, a thermoplastic resin layer having a melting point higher than said ethylene copolymer resin layer, and an adhesive thermoplastic resin layer containing a conductive material disposed between said ethylene copolymer resin layer and said thermoplastic resin layer.

In the packaging material of the invention, the ethylene copolymer resin layer improves physical strength such as tear strength and heat sealing properties, and the thermoplastic resin layer makes heat sealing easy due to its heat resistance and improves bursting strength. The adhesive thermoplastic resin layer secures antistatic property and light-shielding, and it also improves the bonding strength between the ethylene copolymer resin layer and the thermoplastic resin layer. The packaging material of the invention hardly curls and is excellent in moistureproofness, gas barrier, physical strength, heat sealing properties and antistatic property. Nevertheless, the packaging material of the invention is inexpensive.

6 Claims, 1 Drawing Sheet

PACKAGING MATERIAL FOR PHOTOSENSITIVE MATERIALS

BACKGROUND OF THE INVENTION

1. Field of the Invention

This invention relates to a packaging material suitable for photosensitive materials, particularly photographic photosensitive materials.

2. Description of the Prior Art

Various types of packaging materials for photosensitive materials have been put to practical use, and various properties are required according to their uses.

As a packaging material for photosensitive materials, it is necessary to have various properties, such as packaging material slitability, light-shielding, gas barrier, moistureproofness, antistatic property, rigidity, physical strength such as breaking strength, tear strength, impact puncture strength, Gelbo test strength and wear resistance, heat sealing properties such as heat seal strength, side welding ability (cut-seal ability), hot tack properties (hot-seal ability) and seal ability of contrasting material, flatness, slipping character and the like. Conventional packaging materials for photosensitive materials are a single layer film of a high pressure low density polyethylene (LDPE) resin kneaded with carbon black, a composite laminated film composed of a LDPE resin film, paper, aluminum foil, and the like.

As the packaging material, particularly the light-shielding sealing bag, for packaging a roll of a photographic photosensitive material and sheets of a photosensitive material having a weight of heavier than 1 kg, the inventor has already disclosed a laminated film composed of a cross laminated film using uniaxially stretched high density polyethylene (HDPE) resin films having a great physical strength and a LDPE resin film containing at least either a light-shielding material or an antistatic agent (Japanese Utility Model KOKOKU No. 19087/1981). The inventor has also disclosed an inexpensive cross laminated film where heat sealing properties and light-shielding ability are improved (Japanese Utility Model KOKOKU No. 20590/1986).

Furthermore, the inventor has disclosed other packaging materials, composed of a laminated film containing a light-shielding film layer composed of linear low density polyethylene (L-LDPE) resin blended with carbon black, having great physical strength, being excellent in heat sealing properties, and being inexpensive (U.S. Pat. No. 4,701,359, Japanese Patent KOKAI No. 18547/1987).

However, the aforementioned conventional laminated film containing a LDPE resin film is weak in physical strength such as tear strength, in spite of being thick. Moreover, the heat sealing properties are inferior, and it is expensive. As a result, the packaging material was difficult to secure light-shielding, moistureproofness and gas barrier because of puncture, tear or separation of heat sealed portions during packaging or transportation.

The packaging materials having a cross laminated film disclosed in Japanese Utility KOKOKU Nos. 19087/1981 and 20590/1986 have a strong physical strength such as tear strength and tensile strength, and they were put to practical use for packaging heavy materials until to recently. However, they are inferior in heat sealing properties, and the physical strength varies due to the uneven thickness of an adhesive layer, the uneven draw ratio of the uniaxially stretched HDPE resin films, or the like. Occasionally, they were punctured, or the heat sealed portion was separated. Moreover, the cross laminated film where a longitudinally uniaxially stretched film was laminated to a laterally uniaxially stretched film so that their orientation axes were crossed was expensive, because two kinds of film molding machines were necessary.

Since the packaging materials having a light-shielding L-LDPE resin film layer disclosed in U.S. Pat. No. 4,701,359 or Japanese Patent KOKAI No. 18547/1987 are inexpensive and excellent in heat sealing properties and physical strength such as tear strength and impact puncture strength, they are excellent as the packaging material for photosensitive materials. However, in the case of packaging a heavy photosensitive material or a photosensitive material having sharp edges, the light shielding L-LDPE resin films were occasionally elongated and became thin due to their low Young's modulus, though they were not punctured nor torn. In this case, light shielding and moistureproofness cannot be secured sufficiently. Therefore, they were put to practical use as a laminated film, laminated to a high Young's modulus heat resistant film such an aluminum vacuum metallized nylon or polyester film which is expensive.

SUMMARY OF THE INVENTION

An object of the invention is to provide a packaging material for photosensitive materials excellent in physical strength, such as tear strength, tensile strength, bursting strength and impact puncture strength, and heat sealing properties, such as heat resistance of outer layer, heat seal strength, heat seal tolerance, hot tack properties, sealability of contrasting materials, elapsed heat seal strength and heat sealability at low temperature.

Another object of the invention is to provide a packaging material for photosensitive materials excellent in antistatic property.

Another object of the invention is to provide a packaging material for photosensitive materials which hardly or do not curl.

Another object of the invention is to provide a packaging material for photosensitive materials capable of packaging a heavy photosensitive material or a photosensitive material having sharp edges and which is inexpensive.

Such objects have been achieved by a packaging material which comprises a coextruded multilayer light-shielding film comprising an ethylene copolymer resin layer containing more than 30 wt. % of ethylene copolymer resin and an antioxidant, a thermoplastic resin layer having a melting point higher than said ethylene copolymer resin layer, and an adhesive thermoplastic resin layer containing a conductive material disposed between said ethylene copolymer resin layer and said thermoplastic resin layer.

DETAILED DESCRIPTION OF THE INVENTION

Figure 1:
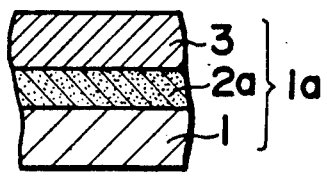
FIGS. 1 to 8 are partial sectional views of preferred embodiments of the invention.

The ethylene copolymer resin layer contains more than 30 wt. % of ethylene copolymer resin. The ethylene copolymer resin includes L-LDPE resin, ethylene-vinyl acetate copolymer (EVA) resin, ethylene-ethylacrylate copolymer (EEA) resin, ethylene-methylacrylate copolymer (EMA) resin and ethylene-acrylic acid copolymer (EAA) resin. Among them, L-LDPE resin is preferable in view of tear strength, impact puncture strength, cost and the like.

The linear low density polyethylene (L-LDPE) resin is called third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferably, the α-olefin has a number of carbon atoms of 4 to 10, and examples of the α-olefin are butene-1, 4-methylpentene-1, hexene-1, heptene-1 and octene-1. The density is usually in the range of 0.87 to 0.95 g/cm$^3$. Most of the L-LDPE resin is synthesized by low pressure method, and partly synthesized by modified high pressure method. Examples of commercial L-LDPE resin are "G-Resin" "Tuflin" and "NUC-FLX" (UCC), "NUC Polyethylene-LL" and "Tufthene" (Nippon Unicar) "Excelene V" (Sumitomo Chemical), "Idemitsu Polyethylene-L" and "Moretec" (Idemitsu Petrochemical), "Dowlex" (Dow Chemical), "Suclear" (DuPont de Nemour, Canada), "Marlex" (Phillips), "Neozex" and "Ultzex" (Mitsui Petrochemical Industries), "Nisseki Linirex" (Nippon Petrochemicals), "Stamilex" (DSM), and the like. In view of physical strength and heat seal strength, the preferred L-LDPE resin is a copolymer of which the number of carbon atoms of the α-olefin is 6 to 8, and it has an ethylene content of 90 to 99.5 mol. %, i.e. an α-olefin content of 0.5 to 10 mol. %, a melt index (MI) of 0.8 to 30 g/10 minutes (ASTM D-1238) and a density of 0.870 to 0.940 g/cm$^3$ (ASTM D-1505), produced by liquid phase process.

The content of the ethylene copolymer resin of the ethylene copolymer resin layer is more than 30 wt. % preferably more than 50 wt. %. When the content is less than 30 wt. %, physical strength, particularly tear strength, impact puncture strength and Gelbo test strength, is insufficient, and heat sealing properties, such as heat seal strength, hot tack properties, sealability of contraries, elapsed heat seal strength and heat sealability in low temparature, are inferior. As a result, the packaging material is punctured or torn, or the heat sealed portion is separated, during packaging or transportation.

An antioxidant is added into the ethylene copolymer resin layer. Suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl p-cresol, 2,2'-methylenebis(4-methyl-6-t-butylphenol), 4,4'-thiobis(3-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene and tetrakis methylene-3(3',5'-di-t-butyl-4'-hydroxyphenyl)propionate methane. The sulfur-containing antioxidants include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Preferable antioxidants are 2,6-di-t-butyl-p-cresol (BHT), low volatile high molecular weight phenol antioxidant ("Irganox 1010", "Irganox 1076", trade names of Ciba-Geigy AG, "Topanol CA", trade name of I.C.L., "Ionox 330" trade name of Shell), dilaurylthiodipropionate, distearylthiodipropionate and dialkylphosphate. Particularly preferable antioxidants are phenol antioxidants (various "Irganox" of Ciba-Geigy AG, and "Sumilizer BHT", "Sumilizer BP-76", "Sumilizer WX-R", "Sumilizer BP-101", etc. of Sumitomo Chemical Co., Ltd.) Two or more antioxidants may be combined. The content of the antioxidant is usually 0.001 to 1 wt. %. In the case that two or more antioxidants are added, the above content is the total amount of them. When the content is less than 0.001 wt. %, the effect of blending does not appear. While, when the content is more than 1 wt. %, the photographic photosensitive material is adversely influenced by the antioxidant. Accordingly, a lower content in the range capable of preventing the generation of lumps and coloring trouble is preferable.

The ethylene copolymer resin layer may be composed of ethylene polymer resin and antioxidant alone, and while, it may contain oLher resins and other additives. Suitable resins for blending with the ethylene copolymer resin include L-LDPE resin, EVA resin, EEA resin, EMA resin, EAA resin, ionomer resin, adhesive polymer, LDPE resin, MDPE resin, HDPE resin, polypropylene resin, propylene-ethylene copolymer resin, acid-denatured polyethylene resin, etc. The content of other resins is less than 70 wt. %, preferably less than 5.0 wt. %. Suitable additives other than the antioxidant include a light-shielding material such as carbon black, a lubricant and the like.

The blending of a lubricant is particularly preferable in view of improving slipperiness and making the insertion of the product to be packaged easy. The lubricant includes oleic acid amide lubricants, erucic acid amide lubricants, stearic acid amide lubricants, bis fatty acid amide lubricants, silicone lubricants and alkylamine lubricants, and the content not affecting adversely photographic photosensitive materials is 0.01 to 1 wt. %. Two or more lubricants may be combined. Preferable lubricants are fatty acid amide lubricants having a number of carbon atoms of 8 to 50, particularly 15 to 35. The lubricant may be incorporated into other layers.

Examples of commercial lubricants suitable for the present invention are as follows:

Oleic acid amide lubricants; "ARMOSLIP-CP" (Lion Akzo Co., Ltd.), "NEWTRON" and "NEWTRON E-18" (Nippon Fine Chemical Co., Ltd.(, "AMIDE-O" (Nitto Kagaku K.K.), "ALFLOW E-10" (Nippon Oil and Fats Co., Ltd), "DIAMID O-200" and "DIAMID G-200" (Nippon Kasei Chemical Co., Ltd.), etc.

Erucic acid amide lubricants; "ALFLOW P-10" (Nippon Oil and Fats Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes such as "SHINETSU SILICONE" (Sinetsu Chemical Co., Ltd.), "TORAY SILICONE" (Toray Silicone Co., Ltd.), etc.

Alkylamine lubricants; "ELECTROSTRIPPER TS-2" (Kao Corp.), etc.

A suitable thickness of the ethylene copolymer resin layer is 7 to 80 μm.

The melting point of the thermoplastic resin layer is higher than the ethylene copolymer resin layer. As a result, the inflating bubble is stable in the inflation molding process. Additionally, the lay-flat width hardly varies, and edge trim loss is sharply decreased. Moreover, the multilayer light-shielding film becomes resistant to adhering to adhere to the hot bar during heat sealing, and the bag-making ability is improved. The melting point of the thermoplastic resin layer is preferably higher than the ethylene copolymer resin layer by 5° C. or more, more preferably by 10° C. or more. The thermoplastic resin layer preferably contains more than 30 wt. %, preferably more than 50 wt. %, of a high Young's modulus resin excellent in tensile strength and bursting strength, such as polyamide resin, polyester resin, polypropylene resin and high density polyethylene resin. The thermoplastic resin layer may be composed of the high Young's modulus resin alone, however, other resins may be blended. Suitable resins for blending with the ethylene copolymer resin include L-LDPE resin, EVA resin, EEA resin, EMA resin, EAA resin, ionomer resin, adhesive polymer, LDPE resin, MDPE resin, HDPE resin, polypropylene resin, propylene-ethylene copolymer resin, acid-denatured polyethylene resin, etc. The content of other resin is less than 70 wt. %, preferably less than 50 wt. %. A suitable thickness of the thermoplastic resin layer is 5 to 70 μm, preferably 7 to 50 μm.

The adhesive thermoplastic resin layer preferably contains more than 20 wt. %, preferably more than 30 wt. %, of resins, such as EEA resin, EVA resin, EAA resin, ionomer resins ("Surlyn" available from Dupont, "Himiran" available from Mitsui Polychemicals, and "Adomer" available from Mitsui Petrochemical Industries) and other adhesive polymers such as olefin resins modified by grafting an unsaturated carboxylic acid compound available as "N-Polymer" or "Modic".

The adhesive thermoplastic resin layer contains a conductive light-shielding material. The light-shielding material includes carbon black, metal powder, metal fiber, carbon fiber and conductive coating filler. Preferable conductive light-shielding materials include carbon black and aluminum powder including aluminum paste, and a suitable content is more than 3 wt. %, preferably 3 to 40 wt. %, more preferably 8 to 20 wt. %.

Carbon blacks are divided into gas black, furnace black, anthracene black, acetylene black, lamp black, channel black, thermal black, graphite, vegetable black and animal black according to their origin. Among these, oil furnace carbon black is preferable in terms of light-shielding character, cost and improvement of properties. On the other hand, since acetylene black and Ketschen carbon black are excellent in an antistatic character, they are also preferable, though they are expensive. They may be blended with the oil furnace black in order to improve its character. However, since Ketschen carbon black is liable to cause fogging of photosensitive materials, the selection of its raw material or a counterplan on the photographic emulsion side is necessary according to circumstances. Suitable pH of carbon black is 5 to 9, particularly at 6 to 8, and suitable mean particle size is 10 to 50 mμ. Particularly, the oil furnace carbon black and acetylene carbon black having pH 6 to 9 and mean particle size of 15 to 30 mμ is preferable. By using the carbon black of such pH and particle size, the adhesive thermoplastic resin layer having the following merits is obtained. That is, the occurrence of fogging is rare, an increase or decrease of photosensitivity scarcely happens light-shielding ability is large, and the lumps of carbon black and pinholes such as fish eyes are rarely generated. The conductive light-shielding material may be incoporated into other layers in addition to the adhesive thermoplastic resin layer.

A suitable thickness of the adhesive thermoplastic resin layer is 5 to 70 μm, preferably 7 to 50 μm.

The adhesive thermoplastic resin layer is disposed between the ethylene copolymer resin layer and the thermoplastic resin layer, and they are simultaneously coextruded. Each of the ethylene copolymer resin layer, the thermoplastic resin layer and the adhesive thermoplastic resin layer may be composed of two or more layers. Moreover, other layers may be incorporated into the coextruded multilayer light-shielding film.

The packaging material of the invention may be composed of the coextruded multilayer light-shielding film alone, or other flexible sheet(s) may laminated thereon. The flexible sheet capable of being laminated with the coextruded multilayer light-shielding film includes various thermoplastic resin films such as various polyethylene resin films, ethylene copolymer resin films, polypropylene resin films, polyvinyl chloride resin films, polyvinylidene chloride resin films, polyamide resin films, polycarbonate resin films, polyester resin films and their modified resin films. Other flexible sheets such as a metallized film such as aluminum metallized film, cellulose acetate film, cellophane, polyvinyl alcohol film, paper, metal foil such as aluminum foil and nonwoven fabric, are also suitable. Preferable flexible sheets are various papers having an areal weight of 20 to 400 g/m² such as unbleached kraft paper, semibleached kraft paper, bleached kraft paper, neutral kraft paper, twisting paper, Clupak paper, duostress paper, white cardboard, photo base paper, pure white roll paper, simili and glassine paper, metal foils 5 to 100 μm in thickness such as aluminum foil, tin foil, zinc foil, lead foil and iron foil, aluminum-metallized paper, metallized films such as aluminum-metallized thermoplastic resin films, and the like.

The packaging material of the invention may be used for packaging photosensitive materials such as photographic photosensitive materials, foods, medicines or chemical substances, and it is particularly suitable for packaging silver halide photographic photosensitive materials, diazo photographic photosensitive materials, photosensitive resins, self-developing type photographic photosensitive materials and other photographic materials which is degraded by a small amount of moisture, light or gas.

The package form may be conventional, and includes a single-sheet flat bag, a double-sheet flat bag, a self-standing bag, a single-sheet gusset bag, a double-sheet gusset bag, inner lining for a moisture proof box, inner lining for a light room-loading light-shielding box, wrapping paper and a leader paper. The sealing form may also be conventional, and includes heat sealing, side welding (heat-cut sealing), impulse heat sealing, supersonic sealing and high frequency sealing. The methods of using an adhesive may also be utilized.

In the packaging material of the invention, the ethylene copolymer resin layer improves physical strength such as tear strength and heat sealing properties, and the thermoplastic resin layer makes heat sealing easy due to its heat resistance and improves bursting strength. The adhesive thermoplastic resin layer secures antistatic property and light-shielding, and it also improves the bonding strength between the ethylene copolymer resin layer and the thermoplastic resin layer. The packaging material of the invention hardly curls and is excellent in moistureproofness, gas barrier, physical strength, heat sealing properties and antistatic property. Nevertheless, the packaging material of the invention is inexpensive.

Representative embodiments of the packaging material of the invention are illustrated in FIGS. 1 to 8.

The packaging material of FIG. 1 is a coextruded multilayer light-shielding film Ia consisting of the ethylene copolymer resin layer 1, the adhesive themoplastic resin layer 2a and the thermoplastic resin layer 3 disposed in this order.

Figure 2:
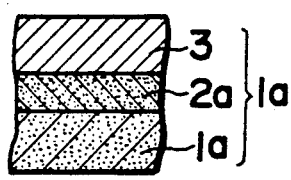

The packaging material of FIG. 2 is the same as the packaging material of FIG. 1, except that a light-shielding material is incorporated into the ethylene copolymer resin layer 1a.

Figure 3:
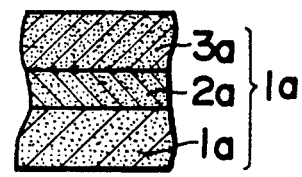

The packaging material of FIG. 3 is the same as the packaging material of FIG. 1, except that a light-shielding material is incorporated into both of the ethylene copolymer resin layer 1a and the thermoplastic resin layer 3a.

Figure 4:
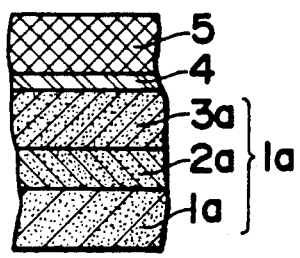

The packaging material of FIG. 4 is composed of the packaging material of FIG. 3 and a flexible sheet layer 5 laminated on the side of the thermoplastic resin layer 3a through an adhesive layer 4.

Figure 5:
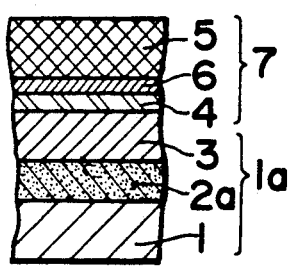

The packaging material of FIG. 5 is composed of the packaging material of FIG. 1 and a metallized flexible sheet layer 7 consisting of a flexible sheet layer 5 and a metal membrane layer 6 laminated on the side of the thermoplastic resin layer 3 through an adhesive layer 4.

Figure 6:
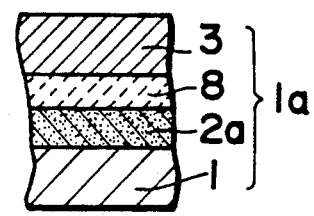

The packaging material of FIG. 6 is a coextruded multilayer light-shielding film Ia consisting of the ethylene copolymer resin layer 1, the adhesive thermoplastic resin layer 2a, an intermediate layer 8 and the thermoplastic resin layer 3.

Figure 7:
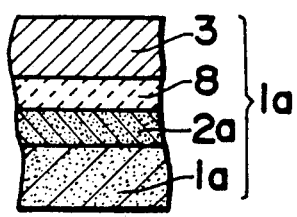

The packaging material of FIG. 7 is the same as the packaging material of FIG. 6, except that a light-shielding material is incorporated into the ethylene copolymer resin layer 1a.

Figure 8:
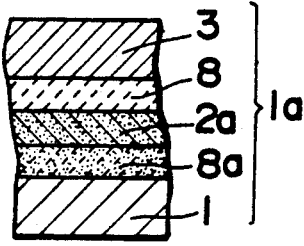

The packaging material of FIG. 8 is a coextruded multilayer light-shielding film Ia consisting of the ethylene copolymer resin layer 1, an intermediate layer 8a containing a light-shielding material, the adhesive thermoplastic resin layer 2a, an intermediate layer 8 and the thermoplastic resin layer 3 disposed in this order.

Figure 9:
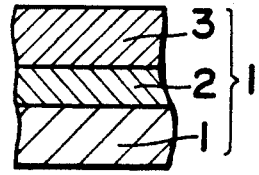
FIGS. 9 and 10 are partial sectional views of comparative packaging materials.
Figure 10:
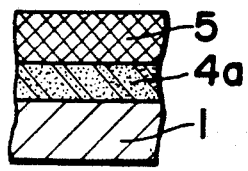

The layer composition of two comparative packaging materials are illustrated in FIGS. 9 and 10.

The comparative packaging material of FIG. 9 is a coextruded multilayer transparent film I consisting of the ethylene copolymer resin layer 1, an adhesive thermoplastic resin layer 2 not containing a light-shielding material and the thermoplastic resin layer 3.

The comparative packaging material of FIG. 10 consists of the ethylene copolymer resin layer 1 and a flexible sheet 5 laminated thereon through an adhesive layer 4a containing a light-shielding material.

EXAMPLES

The packaging material of Example I corresponds to the embodiment of FIG. 2. The ethylene copolymer resin layer was composed of 96.8 wt. % of ethylene-4-methylpentene-1 copolymer resin ("Ultzex 2021L", Mitsui Petrochemical Industries) having a MI of 2.1 g/10 minutes and a density of 0.920 g/cm$^3$, 3 wt. % of oil furnace carbon black ("#44B", Mitsubushi Chemical Industries) having a mean particle size of 21 mu and a pH of 8.0, 0.05 wt. % of oleic acid amide and 0.15 wt. % of BHT ("Sumilizer BHT", Sumitomo Chemical), its melting point was 120° C., and its thickness was 55 μm. The adhesive thermoplastic resin layer 2a was composed of 65 wt. of acid-denatured adhesive polyolefin resin ("Adomer #NF300", Mitsui Petrochemical Industries) having a MI of 1.5 g/10 minutes and a density of 0.94 g/cm$^3$, 25 wt. % of LDPE resin ("DFD-0111", Nippon Unicar) having a MI of 2.4 g/10 minutes and a density of 0.923 g/cm$^3$ and 10 wt. % of the same oil furnace carbon black as above, and its thickness was 25 μm. The thermoplastic resin layer 3 was composed of nylon resin ("NOVAMID #1023CAX", Mitsubishi Chemical Industries) having a melting point of 224° C., and its thickness was 20 μm.

The packaging material of Example II also corresponds to the embodiment of FIG. 2. The ethylene copolymer resin layer 1a and the thermoplastic resin layer 3 were the same as the packaging material of Example I. The adhesive thermoplastic resin layer 2a was composed of 35 wt. % of acid-denatured adhesive polyolefin resin ("Adomer #NF300", Mitsui Petrochemical Industries), 30 wt. % of ethylene-4 methylpentene-1 copolymer resin ("Ultzex 1010L", Mitsui Petrochemical Industries) having a MI of 1.95 g/10 minutes and a density of 0.917 g/cm$^3$, 25 wt. % of LDPE resin ("DFD-0111", Nippon Unicar) and 10 wt. % of oil furnace carbon black ("#44B", Mitsubishi Chemical Industries), and its thickness was 25 μm.

The packaging material of Example III also corresponds to the embodiment of FIG. 2, and it was the same as the packaging material of Example II, except that the acid-denatured polyolefin resin was replaced by ionomer resin ("Himiran 1601", Mitsui Polychemicals) having a MI of 1.2 g/10 minutes and a density of 0.94 g/cm$^3$.

The packaging material of Example IV corresponds to the embodiment of FIG. 1, and it was the same as the packaging material of Example II, except that the ethylene-4-methylpentene-1 copolymer resin of the adhesive thermoplastic resin layer 2a was replaced by another ethylene-4-methylpentene-1 copolymer resin ("Ultzex 2010L", Mitsui Petrochemical Industries) having a MI of 2.1 g/10 minutes and a density of 0.920 g/cm$^3$ and that carbon black was not added to the ethylene copolymer resin layer 1.

The packaging material of Example V also corresponds to the embodiment of FIG. 1, and it was the same as the packaging material of Example IV, except that the thermoplastic resin layer 3 was composed of HDPE resin ("Hizex 3300F", Mitsui Petrochemical Industries) having a MI of 1.1 g/10 minutes, a density of 0.954 g/cm$^3$ and a melting point of 131° C. instead of nylon resin.

Comparative packaging material I corresponds to the packaging material of FIG. 9, and it was the same as the packaging material of Example I, except that carbon black and lubricant were not added to the ethylene copolymer resin layer 1 and that carbon black was not added to the adhesive thermoplastic resin layer 2.

Comparative packaging material II corresponds to the packaging material of FIG. 10. The ethylene copolymer resin layer 1 was composed of ethylene-4-methylpentene-1 copolymer resin ("Ultzex 2021L", Mitsui Petrochemical Industries), and was molded by an inflation molding machine at a thickness of 55 μm. The flexible sheet layer 5 was composed of HDPE resin ("Hizex 3300F", Mitsui Petrochemical Industries), and was molded by an inflation molding machine at a thickness of 30 μm. The above layers were laminated through the adhesive layer 4a 13 μm in thickness having the same resin composition as the adhesive thermoplastic resin layer 2a of the packaging material of Example I.

Various properties of the above packaging materials were measured, and the results are summarized in Table 1.

Tear Strength: According to JIS P-8116
Delamination Resistance:

Each exemplified film having 15 mm in width was partially delaminated at the weakest layer, and one delaminated end was fixed by a clip. Load was added to the other end, and delamination resistance was the weight to begin delamination.

Product Insertion:

A three-sided fin seal bag of B4 size was prepared by using each exemplified packaging material, and the product insertion was judged by the workability at the time when sheet films were inserted into the bag.

I claim:

1. A packaging material for photosensitive materials which comprises a coextruded multilayer light-shielding film comprising an ethylene copolymer resin layer containing more than 30 wt. % of ethylene copolymer resin and an antioxidant, a thermoplastic resin layer having a melting point higher than said ethylene co-

TABLE 1

|  | Invention | | | | | Comparative | |
|---|---|---|---|---|---|---|---|
|  | I | II | III | IV | V | I | II |
| Layer Composition | FIG. 2 | FIG. 2 | FIG. 2 | FIG. 1 | FIG. 1 | FIG. 9 | FIG. 10 |
| Themoplastic Resin Layer | Nylon | Nylon | Nylon | Nylon | HDPE | Nylon | HDPE |
| Adhesive Thermoplastic Resin Layer | CB* 10 wt. % Adomer LDPE | CB* 10 wt. % Adomer L-LDPE LDPE | CB* 10 wt. % Ionomer LDPE | CB* 10 wt. % Adomer L-LDPE LDPE | CB* 10 wt. % Adomer L-LDPE LDPE | No CB Adomer LDPE | CB 10 wt. % Adomer LDPE |
| Ethylene Copolymer Resin Layer | CB 3 wt. % L-LDPE | CB 3 wt. % L-LDPE | CB 3 wt. % L-LDPE | No CB L-LDPE | No CB L-LDPE | No CB No Lubricant | No Lubricant |
| Film Formation | Coextrusion | Coextrusion | Coextrusion | Coextrusion | Coextrusion | Coextrusion | Lamination |
| Light-Shielding | A | A | A | B | B | E | D-E |
| Frictional electrification | +9 V A | +7 V A | +3 V A | +18 V A | +13 V A | −513 V E | +24 V B |
| Curling | 0 cm A | 0 cm A | 0 cm A | 0 cm A | 0 cm A | 0 cm A | −15 cm D |
| Tear Strength | A | A | A | A | B | A | C |
| Delamination Resistance | A | A | A | A | A | A | D-E |
| Product Insertion | B | B | B | B | B | D-E | D-E |

*Carbon Black

Evaluations in Table 1 were carried out as follows:

| A very excellent | B excellent |
|---|---|
| C practical | D having a problem |
| E impractical | |

Light-shielding:

A photographic film of ASA 100 was put into the bag made by each exemplified packaging material, and then the bag was completely sealed. This bag was exposed to light of 80,000 luxes for one hour, and the light-shielding ability was estimated by the fogging degree of the developed photographic film.

Frictional Electrification:

An endless belt of each exemplified packaging material having 35 mm in width and 1350 mm in length was prepared, and this belt was run between two SUS rollers loaded with 500 g at a speed of 12 m/min. The frictional electrification was measured by a voltmeter.

Curling:

A square test piece of each exemplified packaging material having a width of 80 cm and a length of 1 m was hung down, and the curling state was measured. (Judged for suitability for a processing machine.)

polymer resin layer, and an adhesive thermoplastic resin layer containing more than 20 wt. % of a thermoplastic resin selected from the group consisting of ethylene-ethylacrylate copolymer resin, ethylene-vinyl acetate copolymer resin, ethylene-acrylic acid copolymer resin, ionomer resin and graft modified polyolefin resin and containing a conductive light shielding material disposed between said ethylene copolymer resin layer and said thermoplastic resin layer.

2. The packaging material of claim 1 wherein said ethylene copolymer resin is linear low density polyethylene resin being a copolymer of ethylene and α-olefin.

3. The packaging material of claim 1 wherein said ethylene copolymer resin layer contains carbon black.

4. The packaging material of claim 1 wherein said thermoplastic resin layer contains more than 30 wt. % of a high Young's modulus resin selected from the group consisting of polyamide resin, polyester resin, polypropylene resin and high density polyethylene resin.

5. The packaging material of claim 4 wherein said high Young's modulus resin is polyamide resin.

6. The packaging material of claim 1 wherein said conductive material is more than 5 wt. % of carbon black or aluminum powder.

* * * * *